Figure 1:
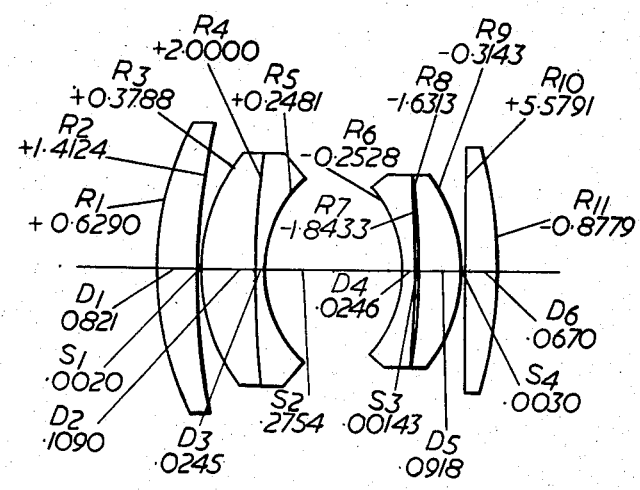

May 9, 1961   G. H. COOK   2,983,192
OPTICAL OBJECTIVES
Filed Sept. 23, 1957

Inventor
Gordon H. Cook
By
Attorneys

United States Patent Office 2,983,192
Patented May 9, 1961

2,983,192

OPTICAL OBJECTIVES

Gordon Henry Cook, Leicester, England, assignor to Taylor, Taylor & Hobson Limited, Leicester, England, a British company Filed Sept. 23, 1957, Ser. No. 685,488

Claims priority, application Great Britain Oct. 1, 1956

14 Claims. (Cl. 88—57)

This invention relates to an optical objective for photographic or other purposes of the kind corrected for spherical and chromatic aberrations, coma, astigmatism, field curvature and distortion and comprising four members of which the first and fourth are constituted by simple convergent components, the second and third members being dispersive. Usually, such second and third members are constituted by two meniscus doublets concave to a diaphragm between them.

The object of the invention is to provide an improved objective of this kind in which a particularly high degree of correction for oblique aberrations, including field curvature astigmatism, coma and oblique spherical aberration, is obtained over a wide angle of view, a high degree of correction for axial spherical aberration, chromatic aberration and distortion also being maintained so that a uniform high standard of definition is obtained for the entire field of view.

In the objective according to the invention, the second member is constituted by a divergent meniscus doublet component and the third member is constituted by a front simple divergent meniscus component and a rear simple convergent meniscus component, all three meniscus components being concave to a diaphragm located between the second and third members, which have a combined equivalent divergent power lying between 0.3 and 0.5 of the equivalent power of the whole objective, the means refractive index of the material of the front element of the meniscus doublet component exceeding the mean refractive index of the material of the rear element thereof by an amount lying between 0.06 and 0.12 and the power of the rear surface of the rear component of the third member lying between 2.1 and 2.8 times the equivalent power of the rear simple convergent component and between 1.75 and 3 times the equivalent power of the whole objective, whilst the axial length of the third member lies between 0.09 F and 0.15 F, where F is the equivalent focal length of the whole objective.

It is to be understood that the terms "front" and "rear" as used herein refer respectively to the side of the longer and of the shorter conjugate in accordance with the usual convention, and that the members are numbered from the front.

It is also to be understood that the power of a surface is referred to herein in its usual significance as defined by the mathematical expression $$\frac{n^1-n}{R}$$

where $n^1$ and $n$ are respectively the mean refractive indices of the materials immediately to the rear and to the front of the surface whose radius of curvature R is reckoned positive if the surface is convex to the front and negative if it is concave thereto. The mathematical expression $$\frac{n^1-n}{R}$$

above defined is positive when the surface has collective power and negative when the surface has dispersive power.

The two concave surfaces of the second and third members enclosing the diaphragm are preferably made of high power to assist in achieving good correction for field curvature.

In order to assist in giving improved correction for oblique spherical aberration, the axial separation between these two concave surfaces preferably lies between 0.4 and 0.7 times the sum of their radii of curvature.

The internal contact surface of the meniscus doublet component is preferably convex to the front with a radius of curvature lying between F and 3 F, the axial thickness of such doublet lying between 0.11 F and 0.16 F.

The comparatively high power of the rear surface of the rear member, the limits of which are mentioned above, helps to improve the correction for zonal spherical aberration, and further improvement is effected when the power of the front surface of the meniscus doublet component is also high. Preferably, the power of the front surface of the meniscus doublet component lies between 2.7 and 3.5 times the equivalent power of the front simple convergent component, the equivalent focal length of such simple component lying between 1.3 F and 1.8 F.

The curvature of the front surface of the rear meniscus component of the third member preferably exceeds that of the rear surface of the front meniscus component thereof by more than 0.025 times the equivalent power of the whole objective.

The difference between the mean refractive indices of the materials of the front simple convergent component and the front element of the meniscus doublet component is preferably greater than zero but less than 0.13.

Good correction for zonal astigmatism is especially achieved by virtue of the power and shape of the front and rear simple convergent components. The power and shape of such components also contribute to the correction of coma and distortion. In particular, the front surface of the rear simple convergent component is preferably convex to the front, while the rear surface thereof is preferably concave to the front with a radius of curvature lying between 0.7 F and 1.2 F, the equivalent focal length of such component lying between 0.7 F and 1.3 F.

Two examples of a practical construction of objective according to the invention are shown respectively in Figures 1 and 2 of the accompanying drawings and numerical data for such examples are given in the respective tables below, in which $R_1$, $R_2$ . . . designate the successive radii of curvature of the surfaces counting from the front (the positive sign indicating that the surface is convex towards the front and the negative sign that it is concave thereto), $D_1$, $D_2$ . . . designate the axial thicknesses of the lens elements, and $S_1$, $S_2$ . . . designate the axial air separations between components. The glass of which each lens element is made is defined in terms of its mean refractive index $n_d$ for the $d$ spectrum line and its Abbé V number.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

Example I

[Equivalent focal length 1.00    Relative aperture F/2.0]

| Radius | Thickness or Air Separation | Refractive Index $n_d$ | Abbé V Number |
|---|---|---|---|
| $R_1 = +0.6290$ | $D_1 = 0.0821$ | 1.6935 | 53.5 |
| $R_2 = +1.4124$ | $S_1 = 0.0020$ | | |
| $R_3 = +0.3788$ | $D_2 = 0.1090$ | 1.6935 | 53.5 |
| $R_4 = +2.0000$ | $D_3 = 0.0245$ | 1.60545 | 38.0 |
| $R_5 = +0.2481$ | $S_2 = 0.2754$ | | |
| $R_6 = -0.2528$ | $D_4 = 0.0246$ | 1.70035 | 30.3 |
| $R_7 = -1.8433$ | $S_3 = 0.00143$ | | |
| $R_8 = -1.6313$ | $D_5 = 0.0918$ | 1.71700 | 47.9 |
| $R_9 = -0.3143$ | $S_4 = 0.0030$ | | |
| $R_{10} = +5.5791$ | $D_6 = 0.0670$ | 1.71700 | 47.9 |
| $R_{11} = -0.8779$ | | | |

Figure 2:
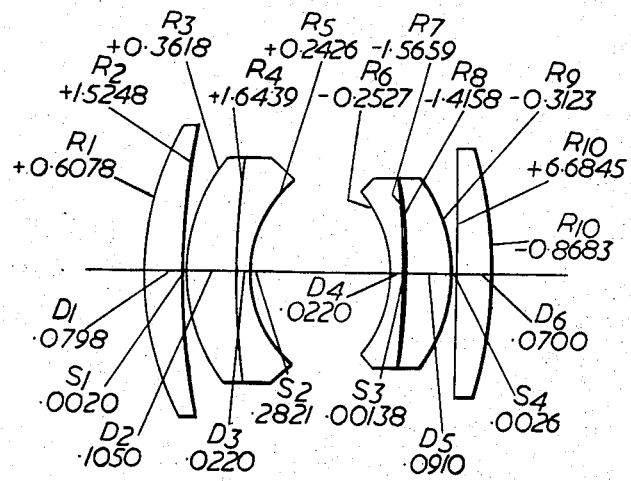

In this example which is shown in Figure 1, the second member has an equivalent focal length of 3.406 F and the third member has an equivalent focal length of 9.273 F, so that the combined equivalent dispersive power of such two members is 0.402/F.

Such combined equivalent dispersive power is rather higher than is usual in objectives of the present kind mainly due to the fact that in the example the powers of the concave surfaces $R_5$ and $R_6$ and the powers of the convex surfaces $R_3$ and $R_9$ have been increased. The increase in the powers of the concave surfaces $R_5$ and $R_6$ helps to improve correction of field curvature but to assist in maintaining adequate correction of zonal spherical aberration the powers of the convex surfaces $R_3$ and $R_9$ are increased also. In the example, the power of the rear surface $R_9$ of the third member is approximately 2.28/F, which is 2.42 times the equivalent power of the rear simple component, such rear simple component having an equivalent focal length of 1.063 F.

The power of the front surface $R_3$ of the meniscus doublet component is approximately 1.83/F, which is 2.87 times the equivalent power of the front convergent component, such convergent component having an equivalent focal length of 1.568 F. The powers of the front and rear simple convergent components, whose equivalent focal lengths are given above, assist in achieving good correction for zonal astigmatism.

The curvature of the rear surface $R_7$ of the front component of the third member is less than that of the front surface $R_8$ of the rear component thereof, the difference between such curvatures being 0.068/F. The difference between the curvatures of the surfaces $R_7$ and $R_8$ is chosen to assist in aberration correction in conjunction with the powers of the surfaces $R_3$, $R_5$, $R_6$ and $R_9$.

In the meniscus doublet component, the refractive index of the material of the front element exceeds that of the material of the rear element by 0.081, the internal contact surface $R_4$ having a radius of curvature of 1.644 F. The refractive indices of the materials of these two elements, together with the radius of curvature of the internal contact surface $R_4$ and the shapes and powers of the two simple convergent components, are chosen to assist in achieving good correction of coma and distortion.

The axial separation $S_2$ of the second and third members in relation to the radii of curvature of the surfaces $R_5$ and $R_6$ bounding such axial air space is important in the control of oblique spherical aberration. In the example, the axial separation between the second and third members, 0.2754 F, is 0.55 times the sum of the radii of curvature of the rear and front surfaces thereof enclosing the diaphragm.

This rather large axial separation $S_2$ in comparison with the radii $R_5$ and $R_6$ increases the effective overall length of the objective and consequently to avoid excessive vignetting, the clear diameters of the front and rear simple convergent components are increased so that the limiting apertures of the objective are the clear diameters of the surfaces $R_3$ and $R_9$. Vignetting is then controlled by keeping to a minimum compatible with aberration correction the axial lengths of the second and third members. In the example the clear diameter of the surface $R_1$ is 0.579 F whilst that of the surface $R_{11}$ is 0.488 F, and the axial length of the third member is 0.1178 F.

The clear diameters of the surfaces $R_3$ and $R_9$ are respectively 0.461 F and 0.382 F, whilst the chamfer diameters of the surfaces $R_5$ and $R_6$ are respectively 0.355 F and 0.323 F.

The objective in this example is corrected for a semi-angular field of 25° and has a back focus of 0.6932 F. The diaphragm is located $$\frac{.137}{R_6}$$

in front of the surface $R_6$.

Example II

[Equivalent focal length 1.00    Relative aperture F/2.0]

| Radius | Thickness or Air Separation | Refractive Index $n_d$ | Abbé V Number |
|---|---|---|---|
| $R_1 = +0.6078$ | $D_1 = 0.0798$ | 1.60982 | 53.3 |
| $R_2 = +1.5248$ | $S_1 = 0.0020$ | | |
| $R_3 = +0.3618$ | $D_2 = 0.1050$ | 1.69321 | 53.5 |
| $R_4 = +1.6439$ | $D_3 = 0.0220$ | 1.60595 | 38.0 |
| $R_5 = +0.2426$ | $S_2 = 0.2821$ | | |
| $R_6 = -0.2527$ | $D_4 = 0.0220$ | 1.70077 | 30.3 |
| $R_7 = -1.5659$ | $S_3 = 0.00138$ | | |
| $R_8 = -1.4158$ | $D_5 = 0.0910$ | 1.71771 | 48.0 |
| $R_9 = -0.3123$ | $S_4 = 0.0026$ | | |
| $R_{10} = +6.6845$ | $D_6 = 0.0700$ | 1.71771 | 48.0 |
| $R_{11} = -0.8683$ | | | |

In this preferred second example shown in Figure 2, the same methods of aberration correction are employed as those described with reference to the first example, but even better and more uniform correction for all oblique aberrations is obtained than in the first example, over the whole semi-angular field of 25 degrees, the back focus of the objective being 0.6944 F.

In such example the second member has an equivalent focal length of 3.733 F and the third member has an equivalent focal length of 9.720 F, the combined equivalent dispersive power of such members being 0.379/F. The power of the rear surface $R_9$ of the third member is 2.298/F, which is 2.43 times the equivalent power of the simple rear component, such rear component having an equivalent focal length of 1.075 F.

The front simple component has an equivalent focal length of 1.605 F, while the power of the front surface $R_3$ of the meniscus doublet component is 1.916/F, which is 3.07 times the equivalent power of such front component, 0.623/F.

The axial separation $S_2$ of the second and third members is approximately 0.57 of the sum of the radii of curvature of the concave surfaces $R_5$ and $R_6$ enclosing the diaphragm, while the axial length of the third member is 0.1144 F. The curvature of the front surface $R_8$ of the rear meniscus component of the third member exceeds that of the rear surface $R_7$ of the front meniscus component thereof by 0.1501/F.

In the meniscus doublet component, the internal contact surface $R_4$ has a radius of curvature of 1.6439 F, whilst the material of the front element thereof has a mean refractive index exceeding that of the rear element by 0.073.

The clear diameters of the front and rear simple components are 0.582 F and 0.490 F respectively. That of the meniscus component is 0.462 F, the chamfer diameter of the surface $R_5$ being 0.358 F. The clear diameters of the two components of the third member are 0.383 F, the chamfer diameter of the surface $R_8$ being 0.326 F. The diaphragm is located $$\frac{.141}{R_6}$$

in front of the surface $R_6$.

It is to be appreciated that the above examples are given by way of example only, and various modifications to the described construction may be made within the scope of the invention.

What I claim as my invention and desire to secure by Letters Patent is:

1. An optical objective corrected for spherical and chromatic aberrations, coma, astigmatism, field curvature and distortion and comprising four members, the first and fourth of which are constituted by simple convergent components, the second of which is constituted by a divergent meniscus doublet component and the third of which is constituted by a front simple divergent meniscus component and a rear simple convergent meniscus component, all three meniscus components being concave to a diaphragm located between the second and third members, which have a combined equivalent divergent power lying between 0.3 and 0.5 of the equivalent power of the whole objective, the mean refractive index of the material of the front element of the meniscus doublet component exceeding the mean refractive index of the material of the rear element thereof by an amount lying between 0.06 and 0.12, while the power of the front surface of such meniscus doublet component lies between 2.7 and 3.5 times the equivalent power of the simple convergent component constituting the first member, the equivalent focal length of the first member lying between 1.4 F and 1.8 F, the internal contact surface of the doublet meniscus component constituting the second member being convex to the front with a radius lying between F and 3 F, and the power of the rear surface of the rear component of the third member lying between 2.1 and 2.8 times the equivalent power of the rear simple convergent component and between 1.75 and 3 times the equivalent power of the whole objective, whilst the axial length of the third member lies between 0.09 F and 0.15 F, where F is the equivalent focal length of the whole objective.

2. An optical objective as claimed in claim 1, in which the axial separation between the rear surface of the second member and the front surface of the third member lies between 0.4 and 0.7 times the sum of the radii of curvature of such surfaces.

3. An optical objective as claimed in claim 2, in which the front surface of the rear simple convergent component is convex to the front and the rear surface thereof is concave to the front with radius of curvature lying between 0.7 F and 1.2 F, the equivalent focal length of such component lying between 0.7 F and 1.3 F.

4. An optical objective as claimed in claim 3, in which the axial thickness of the meniscus doublet component lies between 0.11 F and 0.16 F.

5. An optical objective as claimed in claim 4, in which the curvature of the front surface of the rear meniscus component of the third member exceeds that of the rear surface of the front meniscus component thereof, by between 0.025 and 0.100 F times the equivalent power of the whole objective.

6. An optical objective as claimed in claim 5, in which the difference between the mean refractive indices of the materials of the front simple convergent component and the front element of the meniscus doublet component is greater than zero but less than 0.13.

7. An optical objective as claimed in claim 2, in which the front surface of the rear simple convergent component is convex to the front and the rear surface thereof is concave to the front with radius of curvature lying between 0.7 F and 1.2 F, the equivalent focal length of such component lying between 0.7 F and 1.3 F.

8. An optical objective as claimed in claim 2, in which the internal contact surface of the meniscus doublet component is convex to the front with radius of curvature lying between F and 3F and the axial thickness of such component lies between 0.11 F and 0.16 F.

9. An optical objective as claimed in claim 1, in which the front surface of the rear simple convergent component is convex to the front and the rear surface thereof is concave to the front with radius of curvature lying between 0.7 F and 1.2 F, the equivalent focal length of such component lying between 0.7 F and 1.3 F.

10. An optical objective as claimed in claim 1, in which the internal contact surface of the meniscus doublet component is convex to the front with radius of curvature lying between F and 3 F and the axial thickness of such component lies between 0.11 F and 0.16 F.

11. An optical objective as claimed in claim 1, in which the curvature of the front surface of the rear meniscus component of the third member exceeds that of the rear surface of the front meniscus component thereof, by between 0.025 and 0.100/F times the equivalent power of the whole objective.

12. An optical objective as claimed in claim 1, in which the difference between the mean refractive indices of the materials of the front simple convergent component and the front element of the meniscus doublet component is greater than zero but less than 0.13.

13. An optical objective having numerical data substantially in accordance with the following table:

[Equivalent focal length 1.00    Relative aperture F/2.0]

| Radius | Thickness or Air Separation | Refractive Index $n_d$ | Abbé V Number |
| --- | --- | --- | --- |
| $R_1 = +0.6290$ | $D_1 = 0.0821$ | 1.6935 | 53.5 |
| $R_2 = +1.4124$ | $S_1 = 0.0020$ | | |
| $R_3 = +0.3788$ | $D_2 = 0.1090$ | 1.6935 | 53.5 |
| $R_4 = +2.0000$ | $D_3 = 0.0245$ | 1.60545 | 38.0 |
| $R_5 = +0.2481$ | $S_2 = 0.2754$ | | |
| $R_6 = -0.2528$ | $D_4 = 0.0246$ | 1.70035 | 30.3 |
| $R_7 = -1.8433$ | $S_3 = 0.00143$ | | |
| $R_8 = -1.6313$ | $D_5 = 0.0918$ | 1.71700 | 47.9 |
| $R_9 = -0.3143$ | $S_4 = 0.0030$ | | |
| $R_{10} = +5.5791$ | $D_6 = 0.0670$ | 1.71700 | 47.9 |
| $R_{11} = -0.8779$ | | | | wherein $R_1$, $R_2$ ... represent the radii of curvature of the individual surfaces counting from the front, the positive sign indicating that the surface is convex to the front and the negative sign that it is concave to the front, $D_1$, $D_2$ ... represent the axial thicknesses of the elements, and $S_1$, $S_2$ ... represent the axial air separations between the components.

14. An optical objective having numerical data substantially in accordance with the following table:

[Equivalent focal length 1.00    Relative aperture F/2.0]

| Radius | Thickness or Air Separation | Refractive Index $n_d$ | Abbé V Number |
|---|---|---|---|
| $R_1 = +0.6078$ | | | |
| | $D_1 = 0.0798$ | 1.60982 | 53.3 |
| $R_2 = +1.5248$ | | | |
| | $S_1 = 0.0020$ | | |
| $R_3 = +0.3618$ | | | |
| | $D_2 = 0.1050$ | 1.69321 | 53.5 |
| $R_4 = +1.6439$ | | | |
| | $D_3 = 0.0220$ | 1.60595 | 38.0 |
| $R_5 = +0.2426$ | | | |
| | $S_2 = 0.2821$ | | |
| $R_6 = -0.2527$ | | | |
| | $D_4 = 0.0220$ | 1.70077 | 30.3 |
| $R_7 = -1.5659$ | | | |
| | $S_3 = 0.00138$ | | |
| $R_8 = -1.4158$ | | | |
| | $D_5 = 0.0910$ | 1.71771 | 48.0 |
| $R_9 = -0.3123$ | | | |
| | $S_4 = 0.0026$ | | |
| $R_{10} = +6.6845$ | | | |
| | $D_6 = 0.0700$ | 1.71771 | 48.0 |
| $R_{11} = -0.8683$ | | | | wherein $R_1$, $R_2$ ... represent the radii of curvature of the individual surfaces counting from the front, the positive sign indicating that the surface is convex to the front and the negative sign that it is concave to the front, $D_1$, $D_2$ ... represent the axial thicknesses of the elements, and $S_1$, $S_2$ ... represent the axial air separations between the components.

References Cited in the file of this patent

UNITED STATES PATENTS

| 2,735,340 | Aklin | Feb. 21, 1956 |
| 2,784,646 | Brendel et al. | Mar. 12, 1957 |
| 2,831,397 | Berger et al. | Apr. 22, 1958 |

FOREIGN PATENTS

| 427,008 | Great Britain | Apr. 12, 1935 |